United States Patent
Murakami et al.

(10) Patent No.: US 8,369,618 B2
(45) Date of Patent: Feb. 5, 2013

(54) IMAGE PROCESSING APPARATUS AND IMAGE PROCESSING METHOD FOR REDUCING COLOR BLUR

(75) Inventors: Tomochika Murakami, Utsunomiya (JP); Yasuhiro Sawada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 940 days.

(21) Appl. No.: 12/425,270

(22) Filed: Apr. 16, 2009

(65) Prior Publication Data

US 2009/0263018 A1 Oct. 22, 2009

(30) Foreign Application Priority Data

Apr. 16, 2008 (JP) ................................. 2008-106820

(51) Int. Cl.
*G06K 9/00* (2006.01)
(52) U.S. Cl. ...................................................... 382/167
(58) Field of Classification Search .................. 382/162, 382/167, 199, 255, 274, 279, 293, 298; 348/222.1, 348/241
See application file for complete search history.

(56) References Cited

U.S. PATENT DOCUMENTS

| | | | | |
|---|---|---|---|---|
| 5,204,535 A * | 4/1993 | Mizutani | ........................ | 250/548 |
| 6,219,446 B1 | 4/2001 | Kiriki | | |
| 7,920,172 B2 * | 4/2011 | Chanas et al. | ............. | 348/222.1 |
| 2006/0239549 A1 * | 10/2006 | Kelly et al. | .................... | 382/167 |
| 2008/0165261 A1 | 7/2008 | Kamo | | |
| 2009/0074324 A1 | 3/2009 | Ishiga | | |
| 2009/0141140 A1 * | 6/2009 | Robinson | ................... | 348/222.1 |
| 2012/0057041 A1 * | 3/2012 | Stec et al. | .................. | 348/222.1 |

FOREIGN PATENT DOCUMENTS

| | | | |
|---|---|---|---|
| EP | 1473671 | * | 11/2004 |
| EP | 1523172 | | 4/2005 |
| JP | 10-319518 A | | 12/1998 |
| JP | 2000-003437 | | 1/2000 |
| JP | 2000-069343 A | | 3/2000 |
| WO | 2007/007878 | | 1/2007 |

* cited by examiner

*Primary Examiner* — Phuoc Tran
(74) *Attorney, Agent, or Firm* — Canon USA Inc IP Division

(57) ABSTRACT

The image processing apparatus includes a first reducing part configured to reduce a component of chromatic aberration of magnification which is included in the image, and a second reducing part configured to reduce a component of longitudinal chromatic aberration which is included in the image in which the component of chromatic aberration of magnification has been reduced. The image processing method includes a first step of reducing a component of chromatic aberration of magnification which is included in the image, and a second step of reducing a component of longitudinal chromatic aberration which is included in the image in which the component of chromatic aberration of magnification has been reduced. The apparatus and method can reduce color blur in the image caused by the chromatic aberration of magnification and the longitudinal chromatic aberration.

10 Claims, 13 Drawing Sheets

IMAGE PROCESSING APPARATUS AND IMAGE PROCESSING METHOD FOR REDUCING COLOR BLUR

BACKGROUND OF THE INVENTION

The present invention relates to an image processing technique to improve image quality of an image generated by an image pickup apparatus such as a digital camera.

An optical image formed by a refractive optical system such as a lens includes aberrations, and it is important to suppress the aberrations in optical design of the refractive optical system. In particular in recent years, an image sensor (image pickup element) has a high resolution, and a user often enlarges an image obtained by an image pickup apparatus when watching the image, which makes even a small aberration noticeable.

Methods for suppressing the aberrations include a method combining concave and convex lenses having different refractive indexes and different curvatures and a method using an optical element having special optical characteristics such an optical element formed of fluorite, or a DOE (diffractive optical element). However, aberration correction by such optical methods increases cost and weight of the image pickup apparatus, which goes against requirement of miniaturization and lightening of the image pickup apparatus.

Therefore, it is desired to perform aberration correction by image processing. An aberration correction method using image processing is disclosed in, for example, Japanese Patent Laid-Open No. 2000-003437. The aberration correction method disclosed in Japanese Patent Laid-Open No. 2000-003437 first corrects distortion of digital image data constituted by brightness data and color difference data, and then converts the brightness data and the color difference data into RGB data to correct chromatic aberration of magnification.

The aberration correction method disclosed in Japanese Patent Laid-Open No. 2000-003437 can correct the distortion and the chromatic aberration of magnification. However, this aberration correction method cannot correct chromatic aberrations other than the chromatic aberration of magnification.

In order to obtain digital image data having a higher image quality, a more highly precise correction of chromatic aberrations, that is, correction of chromatic aberrations including longitudinal chromatic aberration is required.

SUMMARY OF THE INVENTION

The present invention provides an image processing apparatus and an image processing method which can reduce both a component of chromatic aberration of magnification and a component of longitudinal chromatic aberration included in an image.

The present invention provides as an aspect thereof an image processing apparatus configured to reduce color blur included in an image which is constituted by plural color planes and generated by an image pickup apparatus. The image processing apparatus includes a first reducing part configured to reduce a component of chromatic aberration of magnification which is included in the image, and a second reducing part configured to reduce a component of longitudinal chromatic aberration which is included in the image in which the component of chromatic aberration of magnification has been reduced.

The present invention provides as another aspect thereof an image processing method for reducing color blur included in an image which is constituted by plural color planes and generated by an image pickup apparatus. The image processing method includes a first step of reducing a component of chromatic aberration of magnification which is included in the image, and a second step of reducing a component of longitudinal chromatic aberration which is included in the image in which the component of chromatic aberration of magnification has been reduced.

The present invention in its second aspect provides an image processing method as specified in claim 8.

Other aspects of the present invention will become apparent from the following description and the attached drawings.

DESCRIPTION OF THE EMBODIMENTS

Exemplary embodiments of the present invention will hereinafter be described with reference to the accompanying drawings.

[Embodiment 1]

Figure 12:
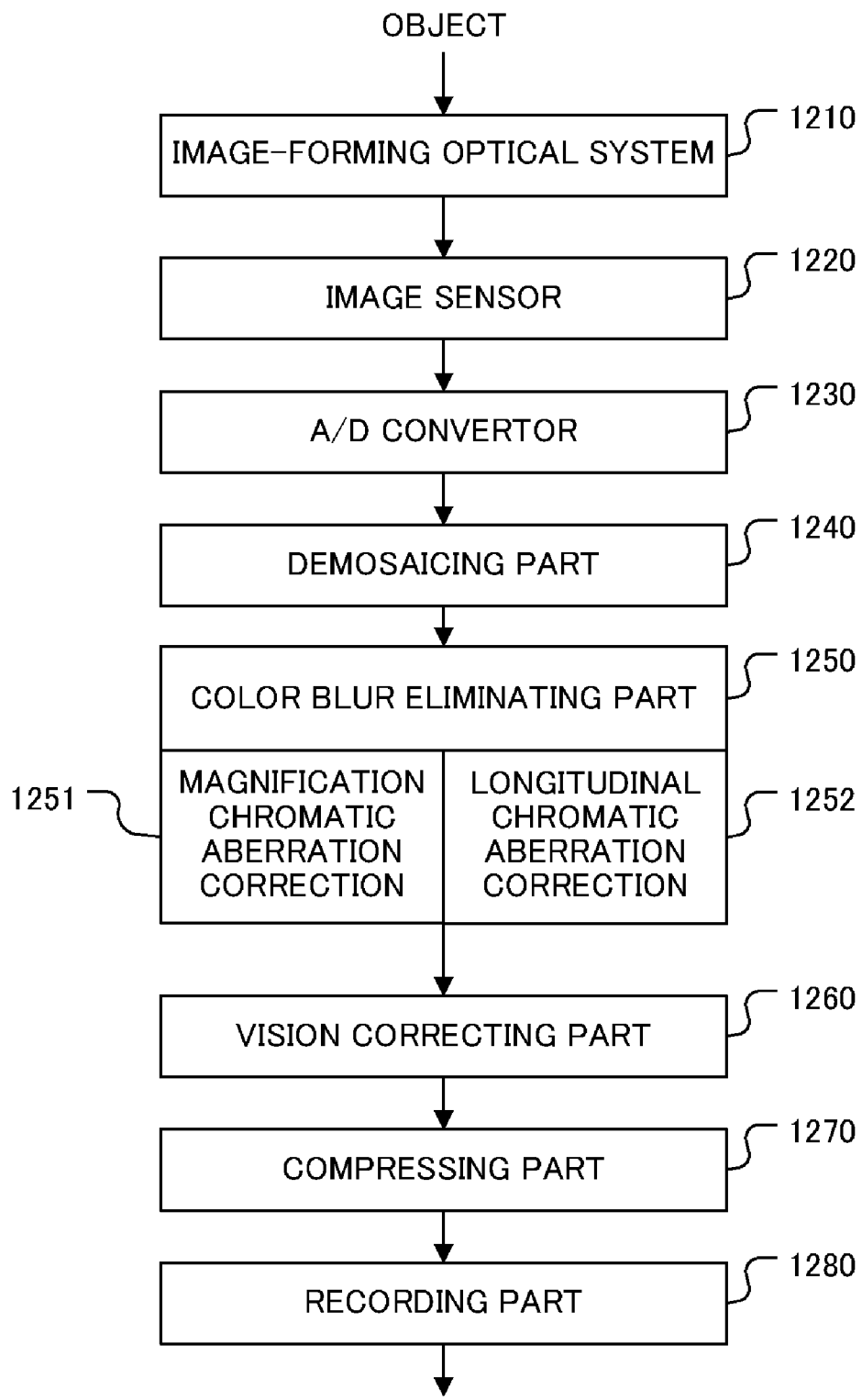
FIG. 12 is a flowchart showing processes performed in a color image pickup apparatus of Embodiment 1.

FIG. 12 shows the basic configuration of a color image pickup apparatus 1200 equipped with an image processing apparatus that is a first embodiment (Embodiment 1) of the present invention.

The color image pickup apparatus 1200 includes an image-forming optical system (image pickup optical system) 1210, an image sensor (image pickup element) 1220, an A/D converter 1230, a demosaicing part 1240, a color blur eliminating part 1250, a vision correcting part 1260, a compressing part 1270, and a recording part 1280.

Light from an object forms an optical image of the object on the image sensor 1220 through the image-forming optical system 1210. In general, an image-forming optical system mounted on a color image pickup apparatus is provided with a certain chromatic aberration correction function which is balanced against various trade-offs such as size and cost. In contrast thereto, in the image-forming optical system 1210 of this embodiment, only longitudinal chromatic aberration in a wavelength region of R (red) to G (green) is corrected well, but longitudinal chromatic aberration in a wavelength region of B (blue) is remained. Such remaining of the longitudinal chromatic aberration in the wavelength region of B enables better correction of other aberrations, and further miniaturization and cost reduction of the image-forming optical system 1210.

Figure 13:
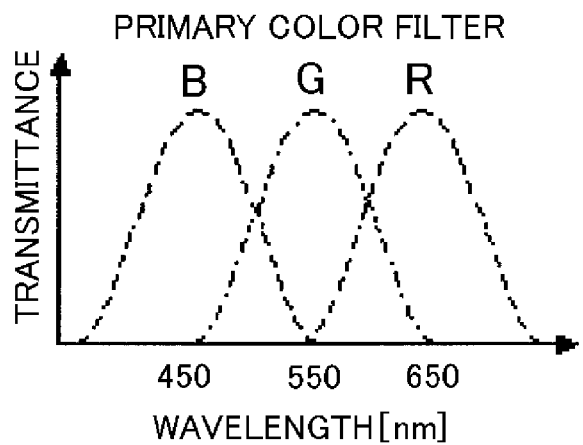
FIG. 13 shows a spectrum characteristic distribution of primary color filters.
Figure 14:
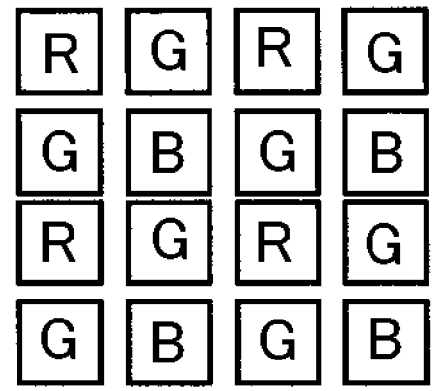
FIG. 14 shows arrangement of color filters in a single image sensor.

The image sensor 1220 is a single color image sensor provided with general primary color filters. The primary color filters are constituted by, as shown in FIG. 13, three color filters respectively having primary transmission wavelength bands near 650 nm, 550 nm and 450 nm. Such an image sensor 1220 captures plural (three) color planes (an R-plane, a G-plane and a B-plane) corresponding to the wavelength regions of R, G and B. In the single color image sensor, as shown in FIG. 14, the color filters are spatially arranged for respective pixels, and therefore the single color image sensor can obtain only intensity in a single color plane for each pixel. In other words, the color image sensor is configured so as to obtain intensities in the respective color planes. Thus, the image sensor outputs a color mosaic image.

In this embodiment, description is made of the case where the image sensor 1220 is provided with the primary color filters constituted by R, G and B to obtain a color image constituted by the color planes of R, G and B. However, even when using an image sensor provided with complementary color filters, a color image constituted by color planes of R, G and B can be obtained by color conversion processing. Therefore, the image sensor provided with the complementary color filters may be used as the image sensor 1220.

The A/D converter 1230 converts the color mosaic image output from the image sensor 1220 as analogue data into digital data appropriate for subsequent image processing.

The demosaicing part 1240 interpolates the color mosaic image to generate a color image whose all pixels have color information of R, G and B. As an interpolation technique, various techniques can be used which include a simple linear interpolation technique and a complex interpolation technique.

Figure 15:
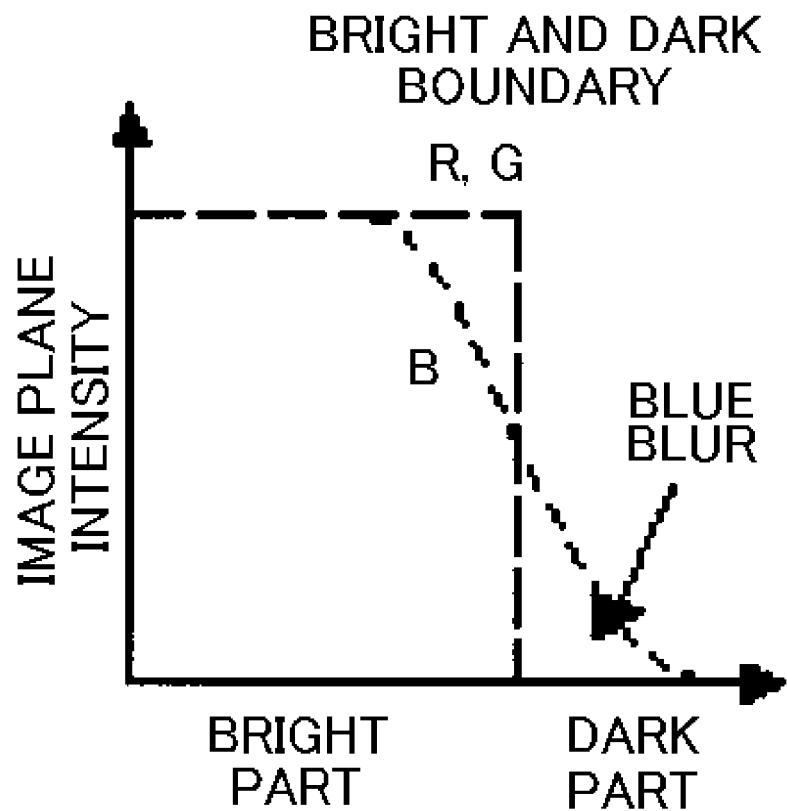
FIG. 15 shows an intensity distribution of color blur generated in a bright and dark boundary portion.

The color image generated by the demosaicing part 1240 contains image components (hereinafter referred to as "chromatic aberration components") corresponding to chromatic aberrations of the image-forming optical system 1210, which results in a color image in which a resolution of the B-plane is lower than those of the R-plane and G-plane. Therefore, at a boundary portion of a bright part and a dark part (hereinafter referred to as "bright and dark boundary portion"), as shown in FIG. 15, blue is blurred and an artifact like a blue edge surrounding the bright part is generated.

The color blur eliminating part 1250 serves as an image processing apparatus in the image pickup apparatus, and performs image processing to eliminate (reduce) the blue artifact (color blur) included in the color image. The color blur eliminating part 1250 includes a magnification chromatic aberration correcting part (first reducing part) 1251 and a longitudinal chromatic aberration correcting part 1252 (second reducing part) that respectively perform processes of steps S101 and S102 which will be described later. Specific processing performed by the color blur eliminating part 1250 will be described later.

The term "eliminate (reduce) the color blur" means both a case where the color blur is completely eliminated and a case where some color blur remains.

The vision correcting part 1260 performs processing on the color image for mainly improving visual image quality such as tone curve (gamma) correction, chroma emphasis, hue correction and edge reinforcement.

The compressing part 1270 compresses the color image processed by the vision correcting part 1260 by a compressing method such as JPEG to reduce its size for recording. The color image compressed by the compressing part 1270 is recorded in a recording medium such as a flash memory by the recording part 1280.

The constituent parts from the A/D converter 1230 to the recording part 1280 can be realized by separate devices or by a single microprocessor.

Next, description will be made of the specific processing performed in the color blur eliminating part 1250.

Figure 1:
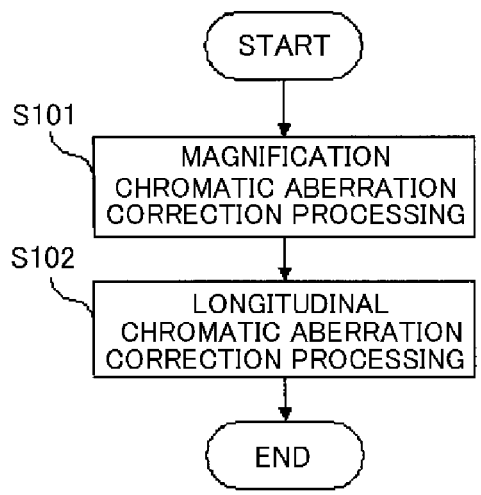
FIG. 1 is a flowchart showing processes performed by a color blur eliminating part in Embodiment 1 of the present invention.

FIG. 1 shows a flowchart of the processing performed by the color blur eliminating part 1250.

The color blur eliminating part 1250 first performs at step S101 magnification chromatic aberration correction processing for eliminating (reducing) a component of chromatic aberration of magnification (hereinafter simply referred to as "chromatic aberration of magnification") included in the color image.

Next, the color blur eliminating part 1250 performs at step S102 longitudinal chromatic aberration correction processing for eliminating (reducing) a component of longitudinal chromatic aberration (hereinafter simply referred to as "longitudinal chromatic aberration") included in the color image in which the chromatic aberration of magnification has been eliminated by the magnification chromatic aberration correction processing.

The chromatic aberration is generated in the image-forming optical system due to a difference of refractive indexes of the image-forming optical system (a lens) according to wavelength. The chromatic aberration appears in two patterns. The one is the chromatic aberration of magnification, and the other is the longitudinal chromatic aberration.

Appearance patterns of the color blur caused by the chromatic aberrations are greatly different in an axial area and an off-axis area. Therefore, in order to highly precisely correct the color blur, it is desirable to apply image processing algorithms appropriate for the respective chromatic aberrations.

(Longitudinal chromatic aberration)

Description will be first made of the longitudinal chromatic aberration. The longitudinal chromatic aberration is a phenomenon in which a difference of refractive indexes of a lens according to wavelength changes an image-forming position on an optical axis to result in generation of color blur in an image.

Figure 2:
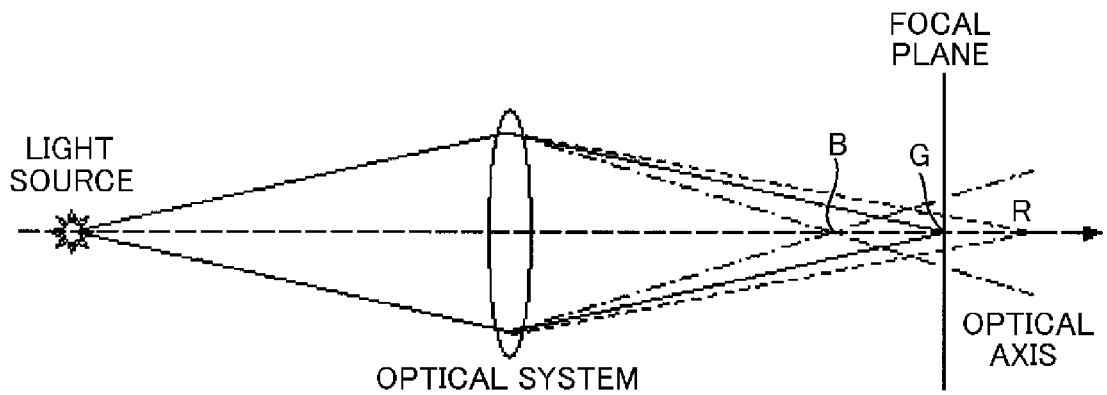
FIG. 2 is a diagram for explaining longitudinal chromatic aberration.

FIG. 2 shows a way of appearance of the longitudinal chromatic aberration. An optical system causes light from a light source to form an optical image at a focal plane on an optical axis of the optical system. However, since the refractive index of the optical system changes according to wavelength, a focal length (image-forming position) also changes according to wavelength.

When concerning image-forming positions of lights at representative wavelengths of R, G and B (for example, 650 nm, 550 nm and 450 nm, respectively), the light at the representative wavelength of B forms an optical image at a position closer to an object than that of the light at the representative wavelength of G, and the light at the representative wavelength of R forms an optical image at a position farther from the object than that of the light at the representative wavelength of G. In a normal optical design of image pickup apparatuses such as cameras, a focal position is determined based on the representative wavelength of G which is high in human's visual sensitivity, the optical images of the representative wavelengths of B and R spread as compared with the optical image of the representative wavelength of G, thereby color blur is generated.

Figure 4:
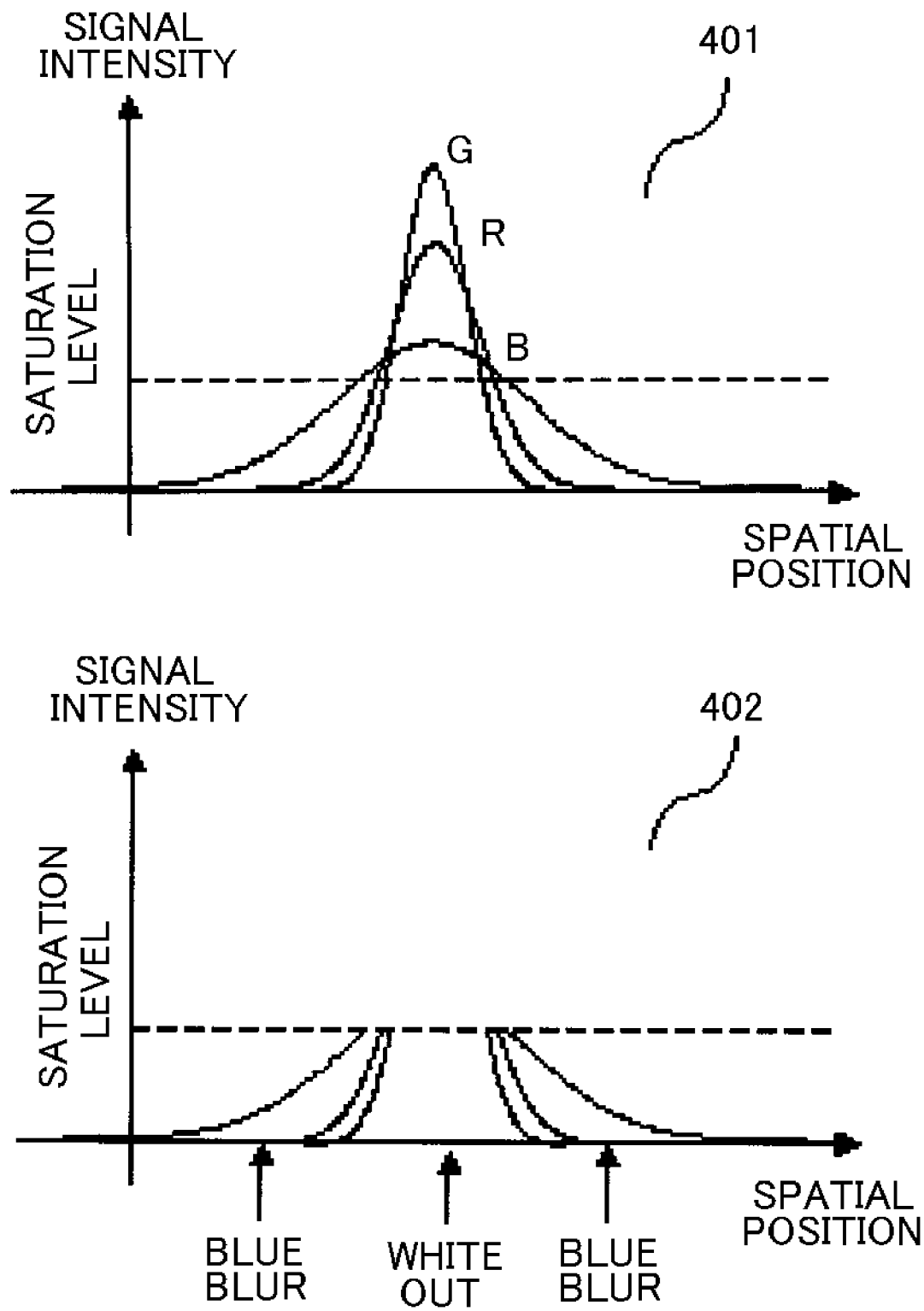
FIG. 4 shows an example of an intensity distribution of an image including longitudinal chromatic aberration on a focal plane.

FIG. 4 shows an example of an intensity (signal intensity) distribution of an optical image including longitudinal chromatic aberration at a focal plane. Reference numeral 401 denotes an intensity distribution of an optical image of a high-brightness object (high-luminance object) at an image plane (focal plane). In this intensity distribution 401, image spread in the G-plane is smallest and image spreads in the R- and B-planes are larger than that in the G-plane. The image spread in the B-plane is larger than that in the R-plane.

When capturing such a high-brightness object image with an image sensor, as shown in an intensity distribution 402, white out is occurred in a central portion where the intensity is saturated, and in a periphery thereof, a rotationally symmetric image with color blur (blue blur) caused by the difference of the image spreads in the respective color planes is obtained.

(Appearance Pattern of Longitudinal Chromatic Aberration)

Figure 8:
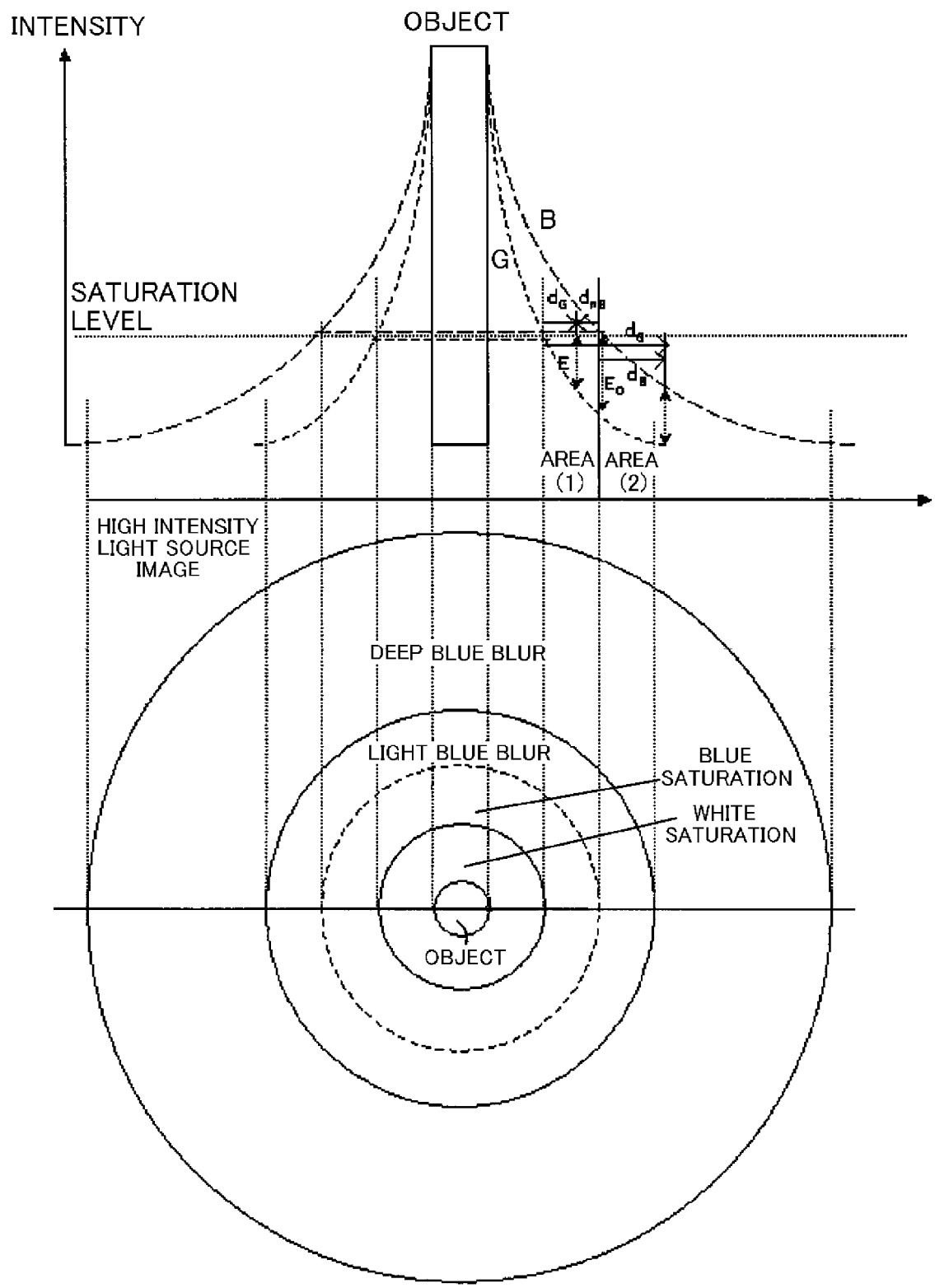
FIG. 8 shows typical profiles of B- and G-planes for a high-brightness object.

FIG. 8 shows a typical profile of B- and G-planes for a high-brightness object. In FIG. 8, a horizontal axis shows a cross section of the image, and a vertical axis shows an intensity in the B- and G-planes. In this figure, a profile of R is the same as that of G.

In FIG. 8, the high-brightness object whose brightness exceeds a saturation brightness exists in a central portion. Also, even in a periphery of the high-brightness object where it is not bright originally, a foot of the profile (that is, blur) is spread due to exuded light from the high-brightness object by aberration and flare. An intensity of this blur depends on the brightness of the high-brightness object and exponentially decreases with increasing distance from the high-brightness object.

In the G-plane, there is not completely without blur, that is, some blur (spread) exists. However, the blur is smaller than that in the B-plane.

Moreover, the image sensor cannot measure intensities higher than its saturation level, so that the intensities higher than the saturation level are cut. Therefore, in the image, G and B are saturated in areas larger than the original high-brightness object, and colors of the saturation areas become white. Although the intensity of G decreases with increasing distance from this white saturation area, an intensity difference of G and B gradually increases since a radius of the saturation area of B is wider than that of the saturation area of G. Therefore, in an area (1) outside the white saturation area, light blue blur is generated and blue therein increases toward the outside.

In an area (2) outside the saturation area of B, the intensity of B begins to decrease with increasing distance from the saturation area of B, and thereby the intensity difference of G and B decreases. Then, in an area outside an edge of the area (2) where the intensity of G is very low, only the intensity of B remains, which results in deep blue blur.

The increased blue in the light blue blur and the deep blue blur are unnatural blue blur. If the blur of B has the same level as that of G, the blur of B is recognized as a color of the high-brightness object, so that the blur of B is natural blur. Such blur is effective image information showing the brightness of the high-brightness object which exceeds the saturation brightness.

(Chromatic Aberration of Magnification)

Next, description will be made of the chromatic aberration of magnification. The chromatic aberration of magnification is a phenomenon in which a difference of refractive indexes of a lens according to wavelength changes an image-forming magnification of an optical system to result in generation of color blur in an image.

Figure 3:
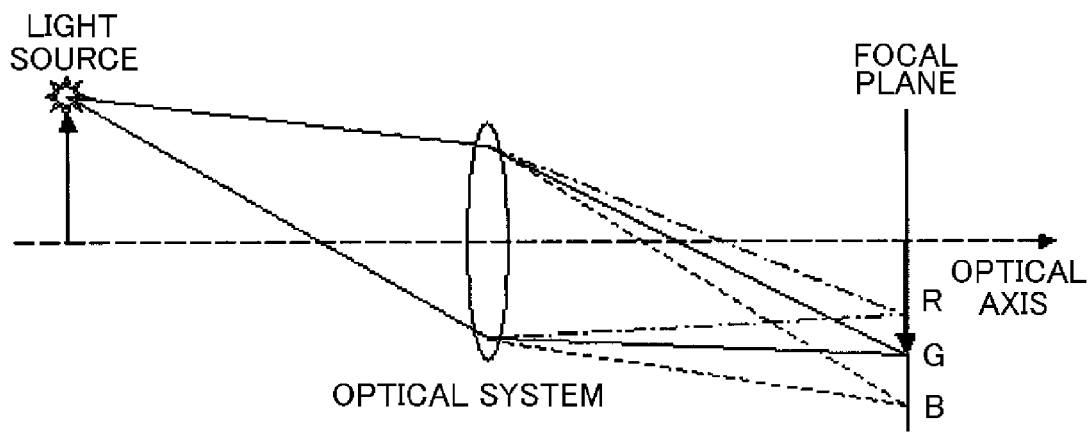
FIG. 3 is a diagram for explaining chromatic aberration of magnification.

FIG. 3 shows a way of appearance of the chromatic aberration of magnification. An optical system causes light from a light source located away from an optical axis of the optical system to form an optical image at a focal plane. However, since the refractive index of the optical system changes according to wavelength, an image height on the focal plane also changes according to wavelength. For example, when considering image-forming positions of lights at representative wavelengths of R, G and B, centers of optical images of the light source appear at different positions as shown in FIG. 3.

Figure 5:
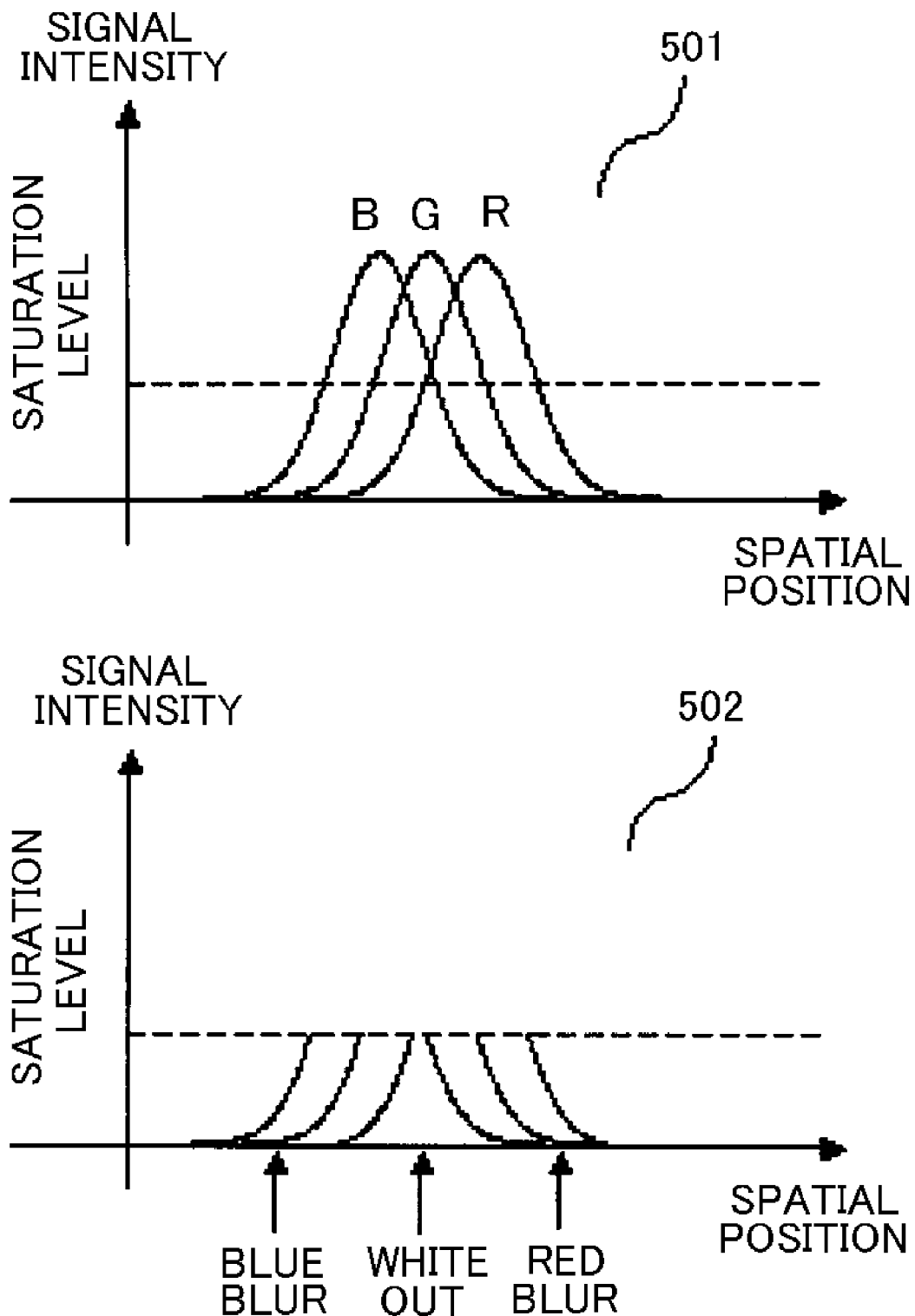
FIG. 5 shows an example of an intensity distribution of an image including chromatic aberration of magnification on a focal plane.

FIG. 5 shows an example of an intensity (signal intensity) distribution of an optical image including chromatic aberration of magnification at a focal plane. In reality, spreads of intensity distributions of the representative wavelengths of R, G and B are not equal to each other since the image-forming magnifications are different from each other. However, FIG. 5 shows the intensity distributions assuming that they have substantially the same spread in order to facilitate understanding.

Reference numeral 501 denotes an intensity distribution of an optical image of a high-brightness object (light source) at an image plane (focal plane). In the intensity distribution 501, center positions of optical images of the light source at the representative wavelengths of R, G and B are different from each other. When capturing the optical images by an image sensor, white out is generated in an area whose image plane illuminance is high, and an image of the light source is obtained which has color blur caused by the intensity spread of R in a certain direction and color blur caused by the intensity spread of B in another direction. Thus, color blur caused by the chromatic aberration of magnification is not rotationally symmetric, unlike the longitudinal chromatic aberration.

(Difference of Appearance Patterns of Color Blur According to Field Angles)

Figure 6:
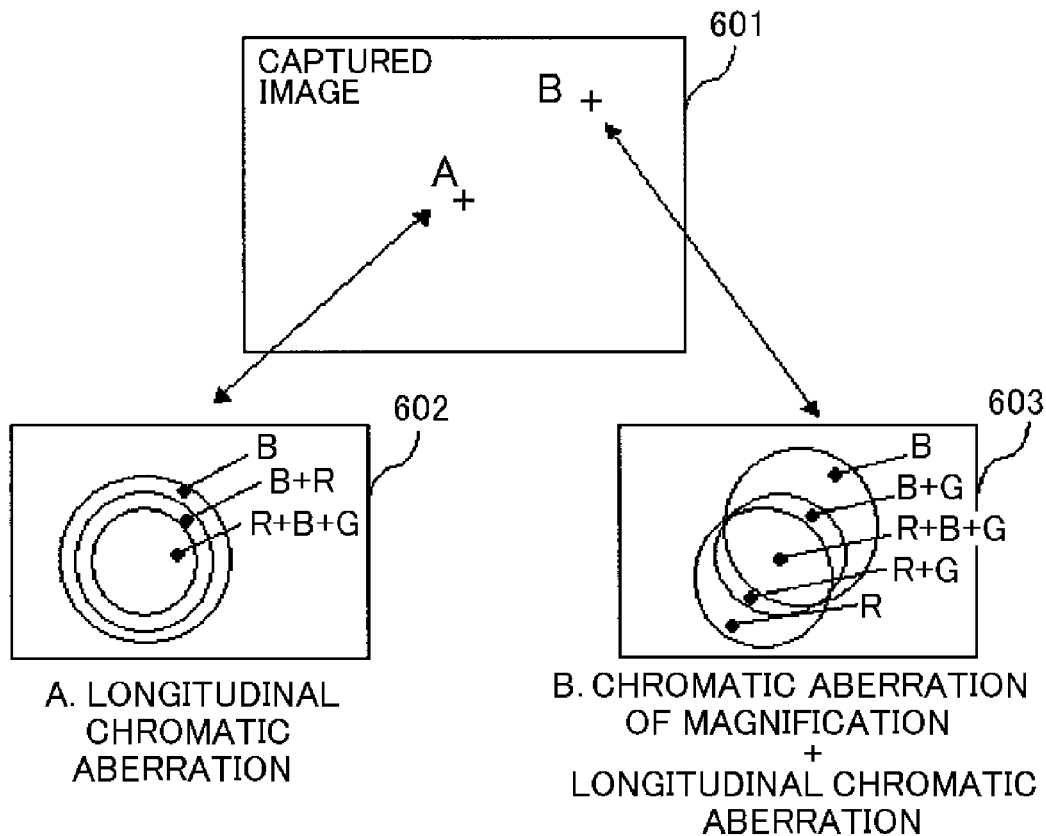
FIG. 6 shows a difference of color blurs according to positions in a captured image.

Next, description will be made of a difference of appearance patterns of color blur according to field angles (positions) in an image captured by image pickup with reference to FIG. 6. Reference numeral 601 denotes an image (captured image) captured by image pickup. Reference numeral 602 denotes a figure showing an appearance pattern of color blur in the captured image 601 in a case where a high-brightness (high-intensity) light source image is captured at a point A corresponding to an optical axis position (that is, on an optical axis) of an optical system. In the FIG. 602, only longitudinal chromatic aberration is generated, and color blur is generated concentrically around the light source.

On the other hand, reference numeral 603 denotes a figure showing an appearance pattern of color blur in the captured image 601 at a point B corresponding to an off-axis position. In the FIG. 603, sizes and center positions of the object images are different at the respective wavelengths due to the chromatic aberration of magnification and the longitudinal chromatic aberration.

As described above, the appearance pattern of the color blur due to the longitudinal chromatic aberration and that of the color blur due to the chromatic aberration of magnification are different from each other. Therefore, in order to eliminate the color blur with high precision, correction processing appropriate for the longitudinal chromatic aberration and correction processing appropriate for the chromatic aberration of magnification are both necessary.

Hereinafter, description will be made of algorithms for correcting the respective chromatic aberrations.

(Algorithm for Correcting Chromatic Aberration of Magnification)

Figure 7:
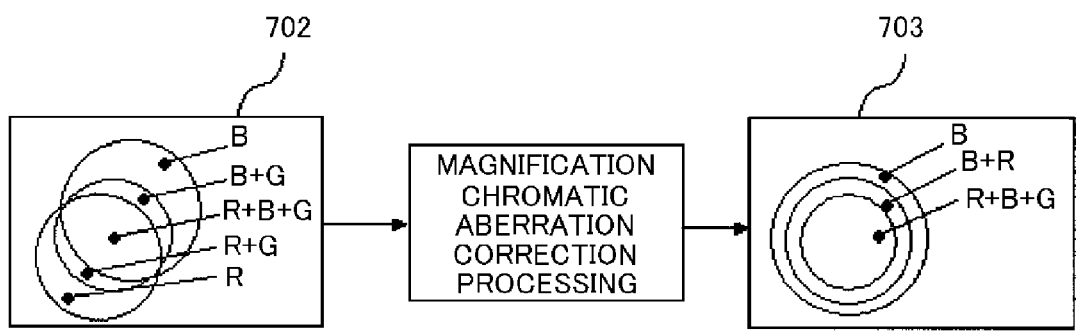
FIG. 7 is a diagram for explaining correction of chromatic aberration of magnification included in an image of a light source at a point B in FIG. 6.

First, description will be made of an algorithm for correcting the chromatic aberration of magnification. FIG. 7 shows an image 702 before correction of the chromatic aberration of magnification in the high-brightness object image at the point B shown in FIG. 6 and an image 703 after the correction. As shown in FIG. 7, the correction of the chromatic aberration of magnification matches high-brightness object image positions in the respective color planes with each other, and thereby color blur appears concentrically.

The chromatic aberration of magnification is generated due to a difference of an image magnification in a color plane other than the G-plane, which is a reference color plane, from that in the G-plane. The color plane other than the G-plane is at least one of the R-plane and the B-plane, which is hereinafter referred to as "R- or B-plane".

Therefore, in the correction of the chromatic aberration of magnification, image processing is not performed in the reference color plane (G), and image processing is performed in the R- or B-plane so as to cause the image magnification therein to coincide with that in the reference color plane (G).

Description will be made of an example of a specific algorithm for correcting the chromatic aberration of magnification. The processing for correcting the chromatic aberration of magnification (hereinafter referred to as "magnification chromatic aberration correction) includes geometric transformation matrix calculation processing and image correction processing based on a geometric transformation matrix calculated by the geometric transformation matrix calculation processing.

The geometric transformation matrix calculation processing calculates a geometric transformation matrix for matching the R- or B-plane after geometric transformation with the reference color plane (G). The geometric transformation matrix is calculated from corresponding relationships between images of plural grid points in a grid having no distortion, the images being calculated from the representative wavelength of G, and images thereof calculated from the representative wavelength of R or the representative wavelength of B.

Next, correction of the images of the R- or B-plane is performed using the calculated geometric transformation matrix. This makes it possible to match the chromatic aberration of magnification in the R- or B-plane with that in the reference color plane (G). Such processing is generally called "warping" or "morphing".

The geometric transformation matrix is changed depending on image pickup conditions when an image is generated by an image pickup apparatus (that is, at the time of image pickup) such as a model of an image-forming optical system (image pickup lens) used by the image pickup apparatus, and a zoom position, an aperture value and a focus position in the image pickup lens. The geometric transformation matrix can be calculated by ray tracing analysis even in any state of the image pickup lens if design data of the model of the image pickup lens and a state at the time of image pickup of the image pickup lens are given. However, such calculation processing needs a long time.

Therefore, it is preferable to calculate geometric transformation matrices corresponding to respective zoom positions, aperture values and focus positions for each model of the image pickup lens in advance, and to store the calculated geometric transformation matrices in a form of a reference data table in a memory or a firmware provided in the image pickup apparatus. Then, a geometric transformation matrix corresponding to a zoom position, an aperture value and a focus position at the time of image pickup may be read from the reference data table. This makes it possible to speed up the processing.

However, it is practically difficult, from a viewpoint of data capacity, to store geometric transformation matrices corresponding to all zoom positions, aperture values and focus positions in the reference data table. Therefore, it is preferable to store geometric transformation matrices corresponding to typical zoom positions, aperture values and focus positions in the reference data table. In this case, as a geometric transformation matrix which is used, a geometric transformation matrix corresponding to a representative image pickup condition which is closest to an actual image pickup condition may be read from the reference data table or may be generated by interpolation calculation using plural geometric transformation matrices corresponding to plural representative image pickup conditions.

(Algorithm for Correcting Longitudinal Chromatic Aberration)

Next, description will be made of an algorithm for correcting the longitudinal chromatic aberration. A basic idea in processing for correcting the longitudinal chromatic aberration (hereinafter referred to as "longitudinal chromatic aberration correction") is to suppress the image spread in the R- or B-plane to a level similar to that in the G-plane where the color blur is smallest. If the blur of R or B has the same level as that of G, the blur is recognized as a color of the high-brightness object, so that the blur is natural blur. Such blur is effective image information showing the brightness of the high-brightness object which exceeds the saturation brightness.

In this embodiment, description will be made of the longitudinal chromatic aberration correction for a color image in which a resolution of the R-plane is lower than those of the G- and B-planes due to the longitudinal chromatic aberration. In the color image, red is blurred in a bright and dark boundary portion in a state where the R-, G- and B-planes are synthesized, and an artifact like a red edge is generated at a periphery of a bright part.

Figure 17:
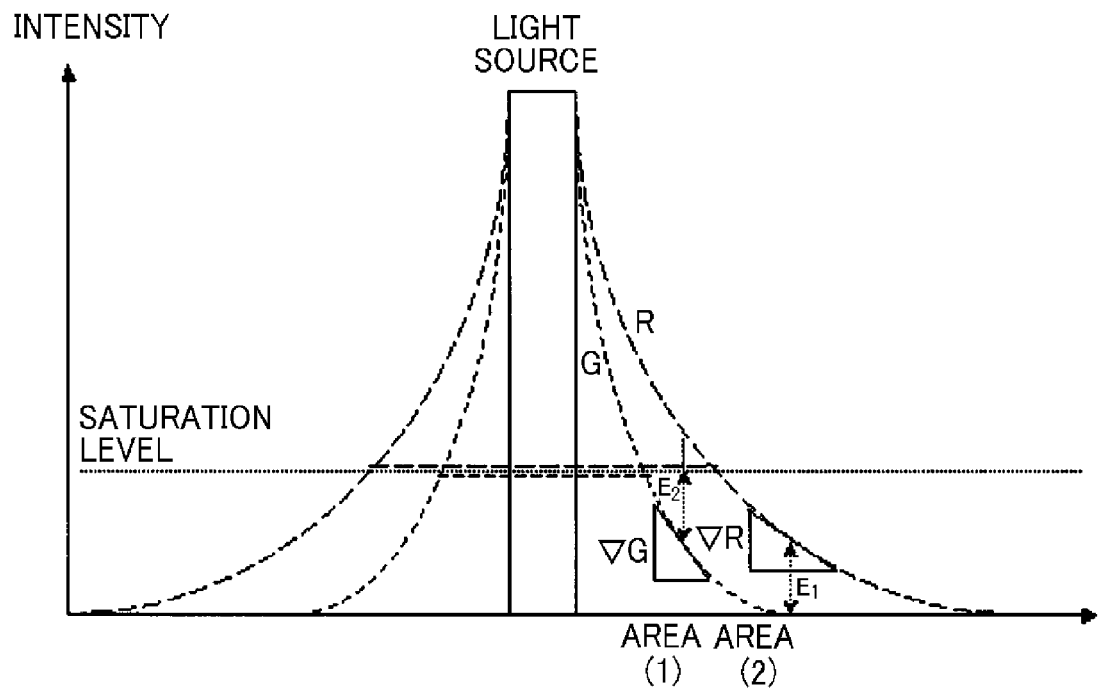
FIG. 17 shows an intensity distribution profile of a high-brightness object image with red blur.

FIG. 17 shows an intensity distribution profile of a high-brightness object (light source) image with red blur. In FIG. 17, an area where only R is saturated and which is adjacent to an area where G and R are both saturated is defined as an area (1), and an area where G and R are not saturated and which is adjacent to the area (1) is defined as an area (2).

As a method for eliminating (reducing) color blur with such a profile, various color blur elimination algorithms can be employed.

In this embodiment, description will be made of a color blur elimination algorithm focusing on a gradient (inclination) of pixel values (hereinafter referred to as "pixel value gradient"). This color blur elimination algorithm is merely an example, and other color blur elimination algorithms may be employed.

Figure 18:
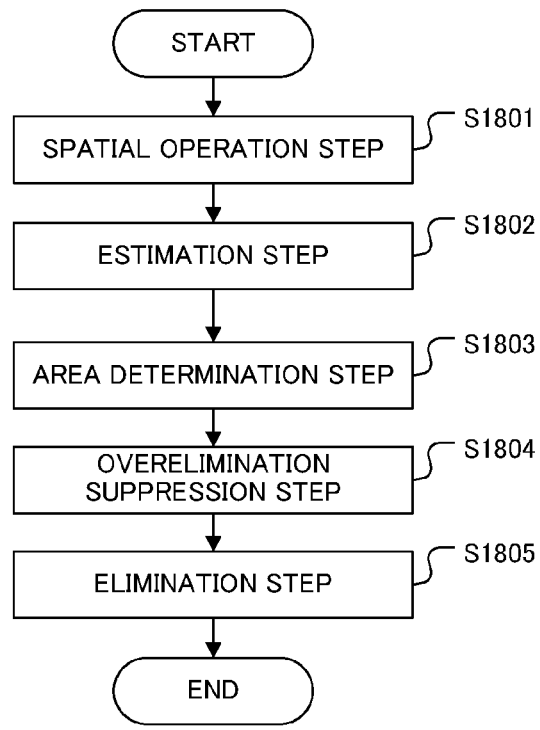
FIG. 18 is a flowchart showing the longitudinal chromatic aberration correction algorithm.

FIG. 18 is a flowchart of an algorithm of the longitudinal chromatic aberration correction in the color blur elimination algorithm.

First, a spatial operation step S1801 calculates maps of brightness gradient which respectively show pixel value gradients $\nabla R$ and $\nabla G$ for the R- and G-planes using the following expressions:

$$\nabla R = \left(\frac{dR}{dx}, \frac{dR}{dy}\right) \equiv \left(\frac{R(x+1, y) - R(x-1, y)}{2}, \frac{R(x, y+1) - R(x, y-1)}{2}\right)$$

$$\nabla G = \left(\frac{dG}{dx}, \frac{dG}{dy}\right) \equiv \left(\frac{G(x+1, y) - G(x-1, y)}{2}, \frac{G(x, y+1) - G(x, y-1)}{2}\right).$$

$G(x+1,y)$ and $R(x+1,y)$ respectively denote pixel values of right adjacent pixels to reference pixels in the G- and R-planes. $G(x-1,y)$ and $R(x-1,y)$ respectively denote pixel values of left adjacent pixels to the reference pixels in the G- and R-planes.

$G(x,y+1)$ and $R(x,y+1)$ respectively denote pixel values of lower adjacent pixels to the reference pixels in the G- and R-planes. $G(x,y-1)$ and $R(x,y-1)$ respectively denote pixel values of upper adjacent pixels to the reference pixels in the G- and R-planes.

Next, an estimation step S1802 estimates an unnecessary intensity, which is color blur, in the R-plane for each pixel of the color image. Estimation methods are different according to whether or not R is saturated. That is, in the area (2) where G and R are not saturated, a blur amount of R is estimated from a pixel value gradient of R (hereinafter referred to as "R-pixel value gradient"). On the other hand, in the area (1) where only R is saturated, a blur amount of R is estimated from a blur amount of G.

The estimated blur amount $E_1$ in the area (2) is calculated by multiplying an absolute value of the R-pixel value gradient $\nabla R$ by a coefficient $k_1$ as follows:

$E_1 = k_1 |\nabla R|$ where $k_1$ is a positive value, which is preferably around three.

On the other hand, the brightness gradient becomes 0 in the area (1) where R is saturated, so that the brightness gradient before saturation is not obtained. Therefore, the estimated blur amount $E_2$ in the area (1) is calculated by multiplying an absolute value of the G-pixel value gradient $\nabla G$ by a coefficient $k_2$ as follows:

$E_2 = k_2 |\nabla G|$ where $k_2$ is a positive value, which is preferably around three.

Next, an area determination step S1803 performs nonlinear conversion of the intensity of the R-plane to generate a saturation degree S. This saturation degree S shows whether or not R is saturated. In a case where the intensity of R is saturated, the saturation degree S is 1, and in a case where the intensity of R is small, the saturation degree S is 0.

Figure 19:
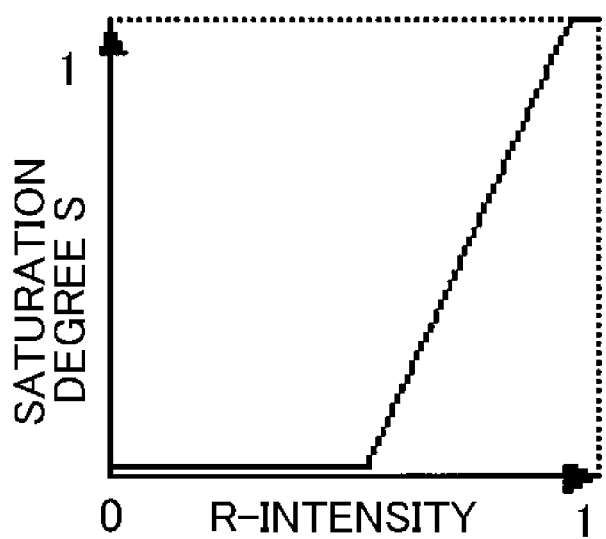
FIG. 19 shows a nonlinear transformation for R intensity.

Although the saturation degree S may be binary values of 0 and 1 as above, it also may be a value continuously changing within a range between 0 and 1 (FIG. 19 shows a case where the saturation degree S changes from an intermediate point in the intensity of R).

Then, the area determination step S1803 selects one of E1 and E2 calculated in the estimation step S1802 according to the saturation degree S. When the saturation degree S is expressed by the binary values of 0 and 1, a new estimated blur amount E is set as follows:

$$E = \begin{cases} E_1 & (S = 0) \\ E_2 & (S = 1) \end{cases}$$

When the saturation degree S is expressed by a value continuously changing within a range between 0 and 1, the new estimated blur amount E is set as follows:

$E = (1-S)E1 + SE2$

Figure 20:
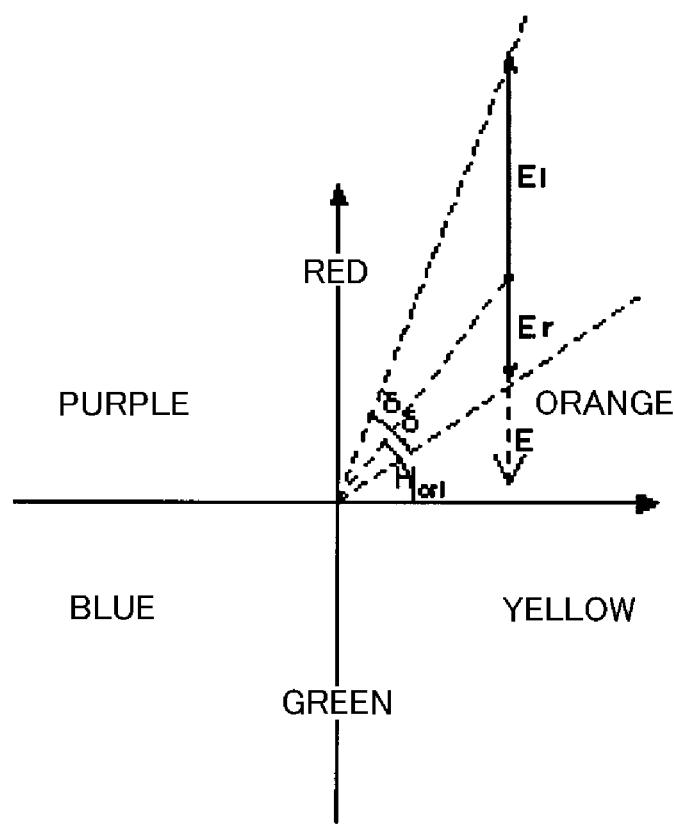
FIG. 20 shows a hue-chroma plane for explaining over-elimination suppressing processing.

Next, an overelimination suppression step S1804 corrects the estimated blur amount E to decide a blur elimination amount E' which is actually eliminated in the R-plane. In this embodiment, the blur elimination amount E' is decided such that a change amount of a hue H with the elimination becomes equal to or lower than a certain angle δ. FIG. 20 shows a hue-chroma plane.

In FIG. 20, the elimination of the estimated blur amount E from the intensity of R moves the hue downward as shown by a dotted arrow. In order to make the change amount of the hue H equal to or lower than the angle δ, a hue Hori before the elimination is first calculated as follows:

Hori = $H(R,G,B)$.

Next, blur elimination amounts Er and El which provide the change angle δ between the hue before the elimination and a hue after the elimination are calculated by using the following expressions:

$H(R-Er,G,B) = $ Hori $- \delta$ $H(R-El,G,B) = $ Hori $+ \delta$ where the angle δ is preferably around 10 to 45 degrees.

The overelimination suppression step S1804 compares these blur elimination amounts Er and El with the estimated blur amount E obtained in the area determination step S1803 to set the blur elimination amount E' to the minimum value thereof:

$E' = \min(E, \max(Er,El,0))$.

Then, the process proceeds to an elimination step S1805. In FIG. 20, the blur elimination amount E' is equal to Er.

The elimination step S1805 subtracts the blur elimination amount E' from the intensity R in the R-plane to calculate a new intensity R in the R-plane as follows:

$R = R - E'$.

Then, the elimination step S1805 outputs a color image in which the color blur in the R-plane has been thus corrected as an output from the color blur eliminating part 1250 to the vision correcting part 1260.

This method refers only the upper, lower, right and left adjacent pixels to the reference pixel (blur elimination target pixel). Therefore, a frame memory with large capacity is not needed, and a buffer memory for two pixel lines enables the longitudinal chromatic aberration correction processing on the entire image with raster scanning. This makes it possible to mount the frame memory as a high-speed and compact circuit in the image pickup apparatus.

The following color blur estimation methods can be used besides the above described color blur estimation method.

For example, the color blur amount may be estimated (calculated) by determining a brightness saturation area and performing convolution of a PSF (point spread function) corresponding to nonlinearly corrected brightness and a position of an image in a correction target color plane.

Moreover, the color blur amount and the image spread may be estimated using a function modeled by an exponential function or a Gauss function according to a distance from the brightness saturation area.

However, it is preferable to perform, as with the method described above, processing for suppressing the hue change due to the overelimination before color blur elimination processing. This overelimination suppression processing enables natural color blur elimination in a manner to suppress the hue change between before and after the color blur elimination processing within a certain range to leave original colors (ground colors).

(Sequence of Aberration Corrections)

Precise elimination (reduction) of the chromatic aberration of magnification and the longitudinal chromatic aberration requires the algorithms different from each other as mentioned above.

As previously described, the off-axis chromatic aberration includes the chromatic aberration of magnification and the longitudinal chromatic aberration. Therefore, the chromatic aberration correction in which the magnification chromatic aberration correction is first performed and the longitudinal chromatic aberration correction is then performed for the entire image enables good elimination of the chromatic aberration from the entire image.

A detailed description will be made of this sequence of the aberration corrections with reference to FIG. 9. First, step 1 in FIG. 9 performs the magnification chromatic aberration correction on an off-axis high-brightness object image (that is, a captured image) 901. This makes it possible to correct the chromatic aberration of magnification well while the longitudinal chromatic aberration remains (see 902).

Figure 9:
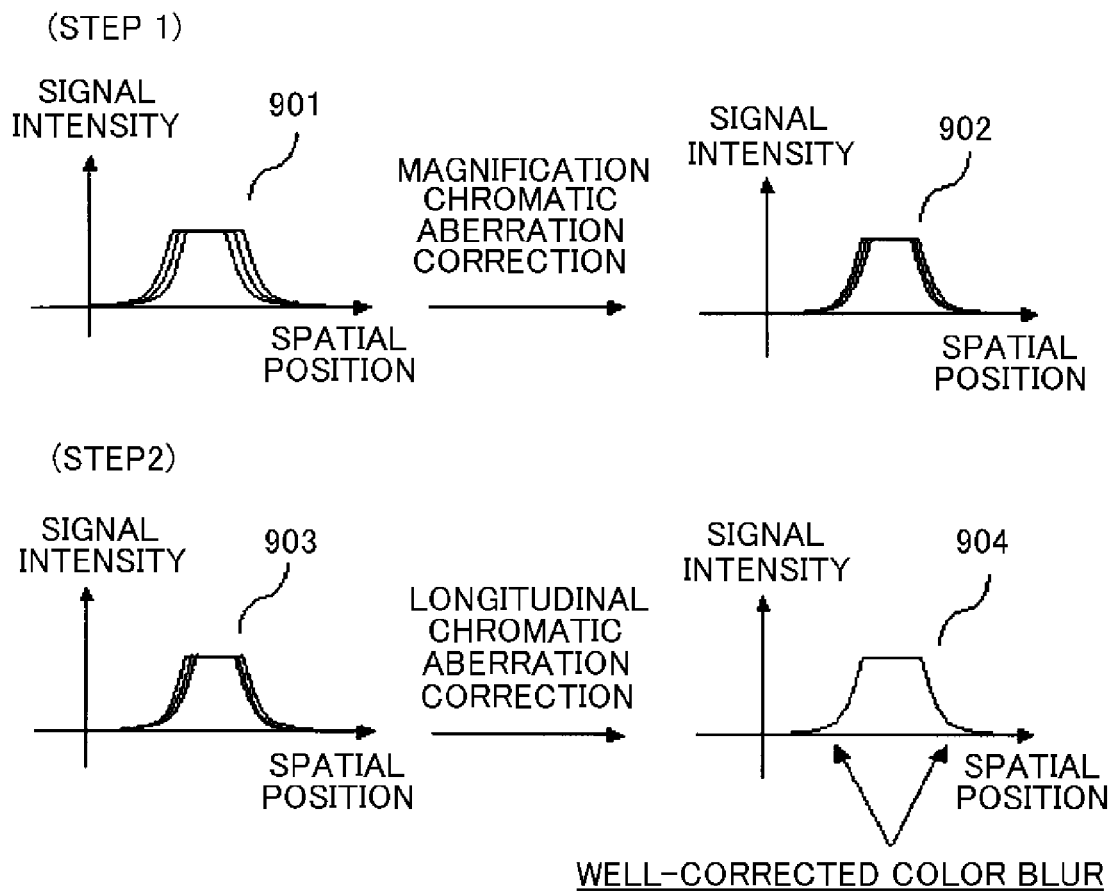
FIG. 9 shows a high-brightness object image in which correction of chromatic aberration of magnification has been performed after correction of longitudinal chromatic aberration.

Next, step 2 in FIG. 9 performs the longitudinal chromatic aberration correction on a high-brightness object image 903 in which the chromatic aberration of magnification has been corrected. Since color blur appears concentrically in the high-brightness object image 903 in which the chromatic aberration of magnification has been corrected, the color blur can be corrected well by the longitudinal chromatic aberration correction (see 904).

Next, description will be made of a case where the chromatic aberration correction is performed in a sequence opposite to that described above with reference to FIG. 10. First, step 1' in FIG. 10 performs the longitudinal chromatic aberration correction on an off-axis high-brightness object image 1001. However, since the off-axis high-brightness object image 1001 also includes color blur due to the chromatic aberration of magnification, the longitudinal chromatic aberration correction algorithm cannot correct the chromatic aberration well (see 1002).

Figure 10:
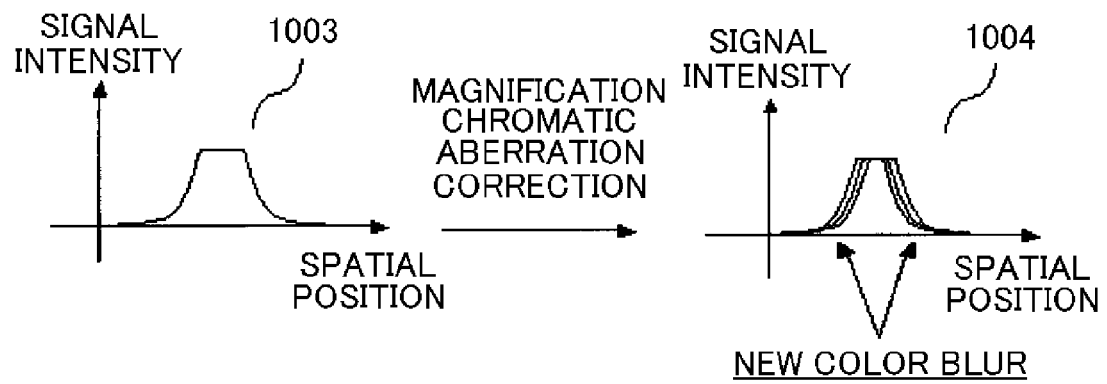
FIG. 10 is a diagram for explaining a principle of a longitudinal chromatic aberration correction algorithm.

Next, step 2' in FIG. 10 performs the magnification chromatic aberration correction on a high-brightness object image 1003 in which the longitudinal chromatic aberration has been corrected. However, since image positions in the respective color planes are spatially moved, color blur that has been partially eliminated appears again, which results in generation of new color blur (see 1004).

Therefore, the color blur eliminating part first performs the magnification chromatic aberration correction and thereafter performs the longitudinal chromatic aberration correction to eliminate the color blur well. This processing sequence is essential to precisely eliminate the color blur.

[Embodiment 2]

Although the description was made of the case where only the correction of the chromatic aberrations is performed in Embodiment 1, description will be made of a case where correction of monochromatic aberration (Seidel's five aberrations) is performed in addition to the correction of the chromatic aberration in a second embodiment (Embodiment 2).

The monochromatic aberration includes spherical aberration, astigmatism, field curvature, comatic aberration and distortion. Among these aberrations, the spherical aberration, the astigmatism, the field curvature and the comatic aberration generate image blur. However, the distortion is an aberration that generates image distortion (deformation), so that correction thereof by image processing is comparatively easy.

Figure 11:
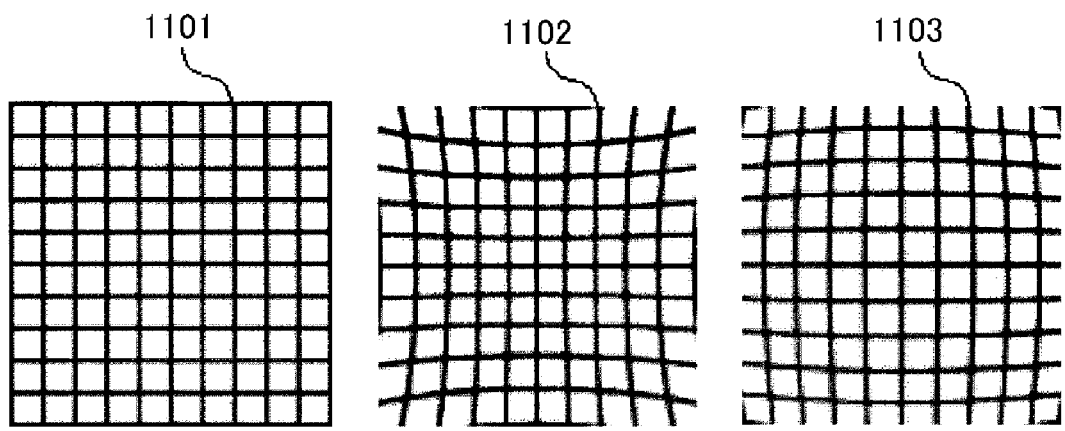
FIG. 11 is a diagram for explaining an appearance pattern of distortion.

FIG. 11 shows an appearance pattern of the distortion (geometric distortion). Reference numeral 1101 denotes a grid image including no distortion, and reference numeral 1102 denotes a grid image including pin-cushion distortion. Reference numeral 1103 denotes a grid image including barrel distortion. Since the monochromatic aberration has no wavelength dependency, it can be corrected in all color planes by using a same correction value.

Since the correction of the distortion (hereinafter referred to as "distortion correction") can be performed by warping as with the magnification chromatic aberration correction, it is preferable to perform the distortion correction at the same time as the magnification chromatic aberration correction. The distortion correction is performed by the color blur eliminating part 1250 described in Embodiment 1 (shown in FIG. 12).

Figure 21:
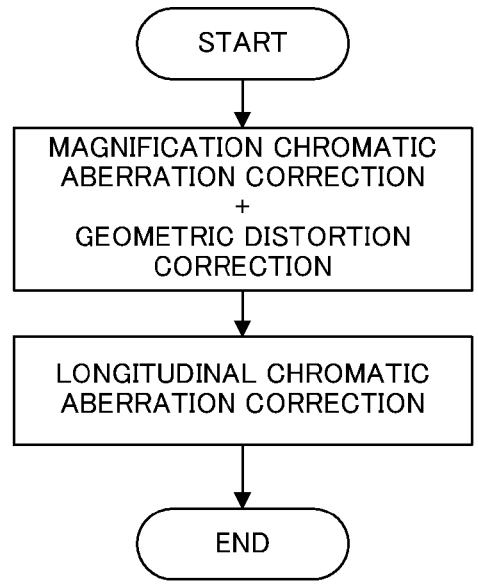
FIG. 21 is a flowchart showing processes performed in a color blur eliminating part in Embodiment 2 of the present invention.

FIG. 21 is a flowchart showing processing performed by the color blur eliminating part 1250 in this embodiment.

Step S2101 corrects only the distortion (displacement from an ideal image height) in the reference color plane (G), and corrects the chromatic aberration of magnification and the distortion (geometric distortion component) in the color planes (R- or B-plane) other than the reference color plane (G). The distortion correction uses a geometric transformation matrix as with the magnification chromatic aberration correction.

The geometric transformation matrix is calculated from corresponding relationships between plural grid points which ideally form images in each color plane and images thereof calculated from the representative wavelength in each color plane. It is preferable, as with Embodiment 1, to calculate geometric transformation matrices corresponding to respective zoom positions, aperture values and focus positions for each model of the image pickup lens in advance, and to store the calculated geometric transformation matrices in a form of a reference data table in a memory or a firmware provided in the image pickup apparatus.

Next, step S2102 performs the longitudinal chromatic aberration correction for eliminating (reducing) the longitudinal chromatic aberration included in a color image in which the magnification chromatic aberration correction has been performed as with step S102 described in Embodiment 1 and the distortion correction has been performed.

Although Embodiments 1 and 2 described the case where the color blur is eliminated from the image captured by the single image sensor, similar color blur elimination processing can be performed on an image captured by three image sensors of R, G and B. In this case, the processing in the demosaicing part 1240 shown in FIG. 12 is unnecessary. However, when using a pixel shift method which generates an image having a resolution twice as high as a resolution that can be obtained by the image sensor, it is preferable to provide a processing part which performs processing for increasing resolution, instead of the demosaicing part 1240.

[Embodiment 3]

Figure 16:
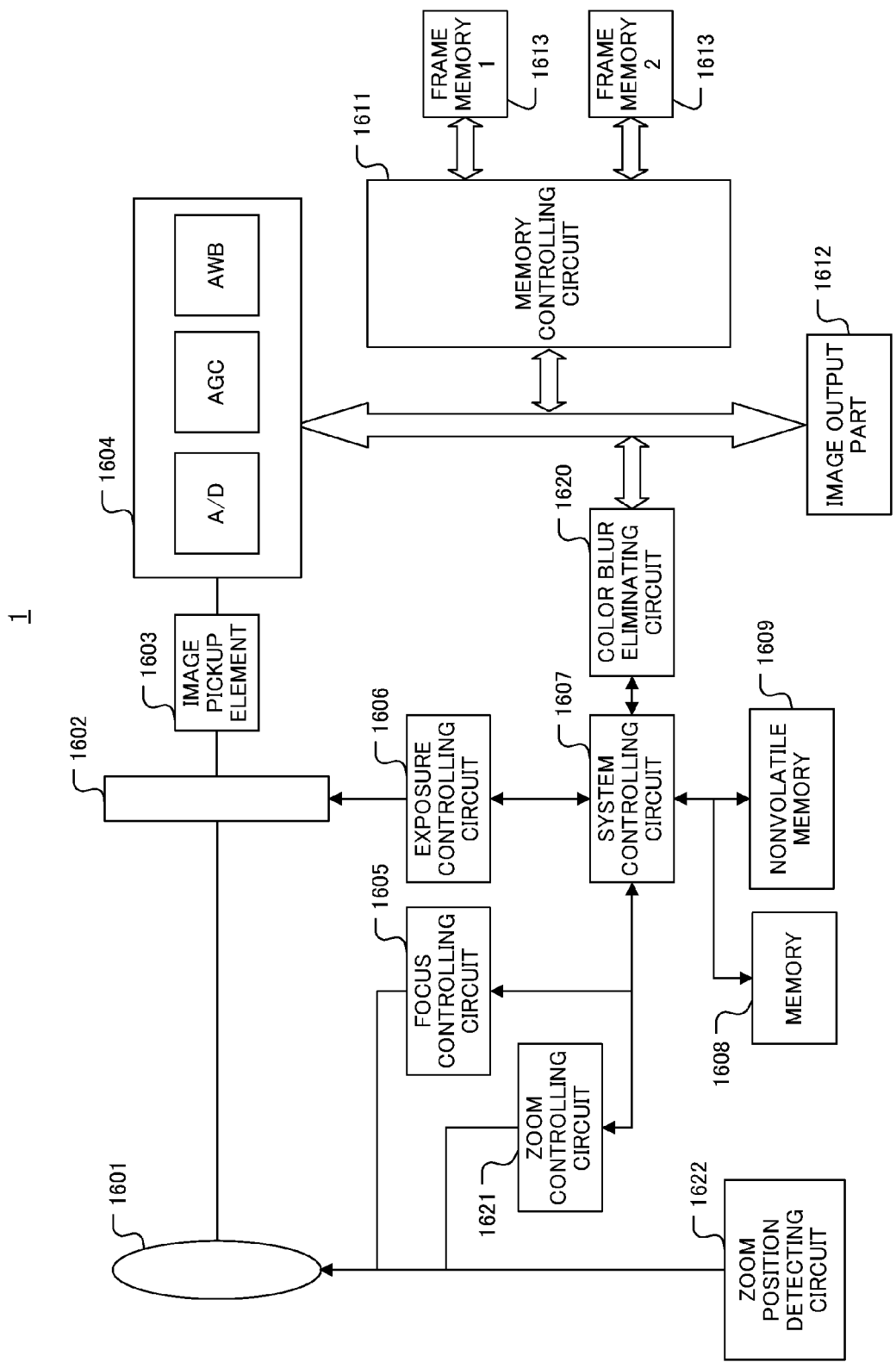
FIG. 16 is a block diagram showing the configuration of an image pickup apparatus of Embodiment 3 (common to that of Embodiment 1) of the present invention.

FIG. 16 shows a more specific configuration of the image pickup apparatus described in Embodiment 1. The image pickup apparatus 1 is provided with an image pickup lens 1601 including an image-forming optical system, an exposure controlling unit 1602, an image pickup element 1603, an image generating circuit 1604, a memory controlling circuit 1611, an image output part 1612 and a frame memory 1613.

The image pickup lens 1601 introduces light from an object to the image pickup element 1603 through the exposure controlling unit 1602. The exposure controlling unit 1602 includes an aperture stop and a shutter. The image pickup element 1603 is constituted by an image sensor such as a CCD sensor or a CMOS sensor, and converts an optical image of the object into an electric signal (analog output signal) to output it.

The image generating circuit 1604 converts the analog output signal from the image pickup element 1603 into a digital signal, and generates an image (image data) from the digital signal. The image generating circuit 1604 includes an A/D converter, an auto gain controlling circuit (AGC), an auto white balance circuit, a pixel interpolation processing circuit and a color conversion processing circuit.

Reference numeral 1605 denotes a focus controlling part which controls focusing of the image pickup lens 1601. Reference numeral 1606 denotes an exposure controlling part which controls the exposure controlling unit 1602. The focus controlling part 1605 and the exposure controlling part 1606 are controlled by using a TTL method, for example. Reference numeral 1621 denotes a zoom controlling circuit which controls zooming of the image pickup lens 1601. Reference numeral 1622 denotes a zoom position detecting circuit which detects a zoom position.

Reference numeral 1607 denotes a system controlling circuit which governs operation and control of the entire image pickup apparatus 1. Reference numeral 1608 denotes a memory which stores data and processing programs for operation control performed by the system controlling circuit 1607. Reference numeral denotes a nonvolatile memory which stores information such as various adjustment values.

Reference numeral 1620 denotes a color blur eliminating circuit which eliminates (reduces) color blur from the image data generated by the image generating circuit 1604. The color blur eliminating circuit 1620 includes the color blur eliminating part 1250 shown in FIG. 12. Enabling/disabling of the color blur eliminating circuit 1620 is selected by ON/OFF of a color blur elimination mode that can be set via an operation part which is not shown in the figure.

The image data input to the color blur eliminating circuit 1620 may not be necessarily data on which all processing is finished in the image generating circuit 1604. That is, image data in the middle of the processing in the image generating circuit 1604 may be input to the color blur eliminating circuit 1620, and then image data processed by the color blur eliminating circuit 1620 may be input again to the image generating circuit 1604 to cause it to continue its processing.

The frame memory 1613 temporarily holds the generated image data in frame or in plural frames.

The memory controlling circuit 1611 controls input and output of the image data for the frame memory 1613.

The image output part 1612 displays the image data in which the color blur has been eliminated by the color blur eliminating circuit 1620 on a display, not shown in the figure, and records it in a recording medium.

[Embodiment 4]

Although Embodiment 3 described the case where the color blur eliminating circuit serving as the image processing apparatus is provided in the image pickup apparatus. However, embodiments of the present invention are not limited thereto.

Figure 22:
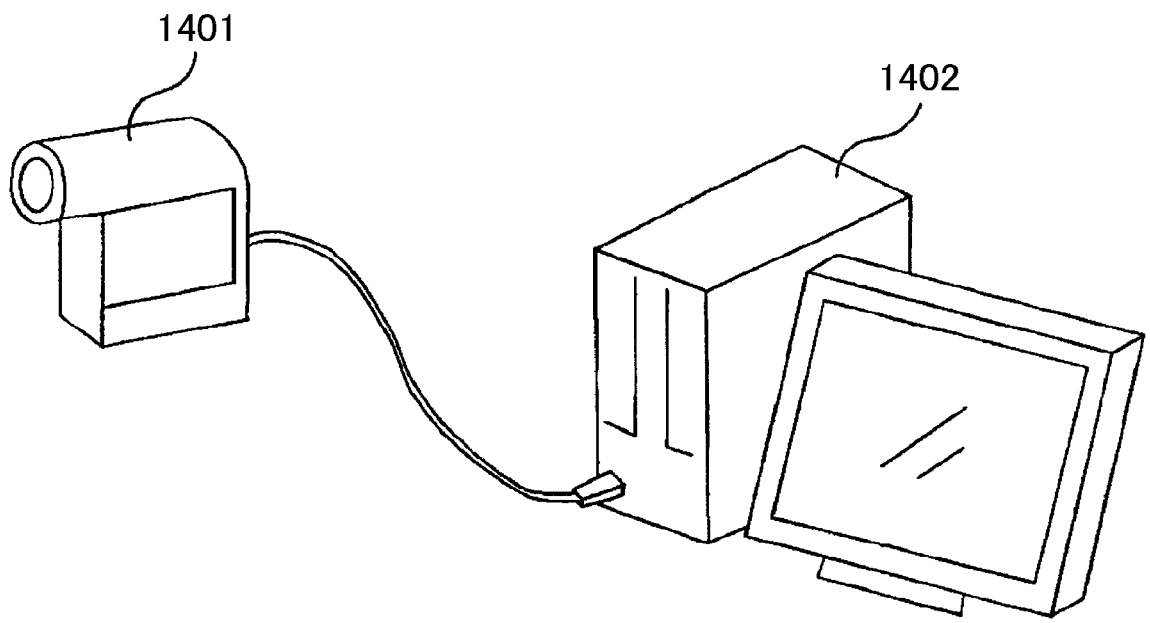
FIG. 22 shows an image processing apparatus that is Embodiment 4 of the present invention.

For example, as shown in FIG. 22, an image generated by an image pickup apparatus 1401 may be transmitted to a personal computer 1402. A method for transmitting the image data may be any one of a cable method and a wireless method, and may be a method using Internet or LAN.

In this case, the personal computer 1402 causes a computer program (image processing program) installed therein to perform processing corresponding to that performed by the color blur eliminating part 1250 described in Embodiment 1. The personal computer 1402 serves as the image processing apparatus in this case.

[Embodiment 5]

Although Embodiments 1 and 2 described the case where the reference data table of the geometric transformation matrices is provided in the image pickup apparatus, the reference data table may be stored in a data base in Internet to use the reference data table downloaded through Internet.

Moreover, in a case where the image pickup lens is interchangeable with respect to the image pickup apparatus, the reference data table may be stored in a memory provided in the image pickup lens. In this case, the reference data table may be transferred to the image pickup apparatus when the image pickup lens is connected with the image pickup apparatus. Furthermore, the image pickup apparatus may update the reference data table stored in the memory provided in the image pickup lens.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2008-106820, filed on Apr. 16, 2008, which is hereby incorporated by reference herein in its entirety.

What is claimed is:

1. An image processing apparatus configured to reduce color blur included in an image which is constituted by plural color planes and generated by an image pickup apparatus, comprising:
 a first reducing part configured to reduce a component of chromatic aberration of magnification which is included in the image; and
 a second reducing part configured to reduce a component of longitudinal chromatic aberration which is included in the image in which the component of chromatic aberration of magnification has been reduced
 wherein the component of longitudinal chromatic aberration is reduced by the second reducing part after the component of chromatic aberration of magnification in the image is reduced by the first reducing part, and
 wherein the component of longitudinal chromatic aberration is calculated based on a gradient of pixel values in each color plane, and the second reducing part is configured to reduce the calculated component of longitudinal chromatic aberration.

2. An image processing apparatus according to claim 1, wherein the first reducing part is configured to reduce the component of chromatic aberration of magnification which is included in a color plane other than a reference color plane in the plural color planes.

3. An image processing apparatus according to claim 1, wherein the second reducing part is configured to reduce the component of longitudinal chromatic aberration which is calculated based on a distance from a brightness saturation area in the image.

4. An image processing apparatus according to claim 1, wherein the second reducing part is configured to reduce the component of longitudinal chromatic aberration which is calculated by convolution of a point spread function corresponding to an image position in each color plane.

5. An image processing apparatus according to claim 1, wherein the first reducing part is configured to calculate the component of chromatic aberration of magnification based on an image pickup condition for generating the image in the image pickup apparatus.

6. An image processing apparatus according to claim 1, wherein the first reducing part is configured to reduce the component of chromatic aberration of magnification and a component of geometric distortion which is included in each color plane.

7. An image processing method for reducing color blur included in an image which is constituted by plural color planes and generated by an image pickup apparatus, comprising:
a first step of reducing a component of chromatic aberration of magnification which is included in the image; and
a second step of reducing a component of longitudinal chromatic aberration which is included in the image in which the component of chromatic aberration of magnification has been reduced
wherein the component of longitudinal chromatic aberration is reduced in the second step after the component of chromatic aberration of magnification in the image is reduced in the first step, and
wherein the component of longitudinal chromatic aberration is calculated based on a gradient of pixel values in each color plane, and the calculated component of longitudinal chromatic aberration is reduced in the second step.

8. An image processing apparatus configured to reduce color blur included in an image which is constituted by plural color planes and generated by an image pickup apparatus, comprising:
a first reducing part configured to reduce a component of chromatic aberration of magnification which is included in the image; and
a second reducing part configured to reduce a component of longitudinal chromatic aberration which is included in the image in which the component of chromatic aberration of magnification has been reduced,
wherein the component of longitudinal chromatic aberration is reduced by the second reducing part after the component of chromatic aberration of magnification in the image is reduced by the first reducing part, and
wherein the component of longitudinal chromatic aberration is calculated based on a distance from a brightness saturation area in the image, and the second reducing part is configured to reduce the calculated component of longitudinal chromatic aberration.

9. An image processing apparatus according to claim 8, wherein the first reducing part is configured to reduce the component of chromatic aberration of magnification which is included in a color plane other than a reference color plane in the plural color planes.

10. An image processing method for reducing color blur included in an image which is constituted by plural color planes and generated by an image pickup apparatus, comprising:
a first step of reducing a component of chromatic aberration of magnification which is included in the image; and
a second step of reducing a component of longitudinal chromatic aberration which is included in the image in which the component of chromatic aberration of magnification has been reduced,
wherein the component of longitudinal chromatic aberration is reduced in the second step after the component of chromatic aberration of magnification in the image is reduced in the first step, and
wherein the component of longitudinal chromatic aberration is calculated based on a distance from a brightness saturation area in the image, and the calculated component of longitudinal chromatic aberration is reduced in the second step.

* * * * *